United States Patent
Nonnenmacher et al.

(10) Patent No.: US 12,417,387 B2
(45) Date of Patent: Sep. 16, 2025

(54) EFFICIENT SECOND ORDER PRUNING OF COMPUTER-IMPLEMENTED NEURAL NETWORKS

(71) Applicant: Robert Bosch GmbH, Stuttgart (DE)

(72) Inventors: Manuel Nonnenmacher, Holzgerlingen (DE); David Reeb, Renningen (DE); Thomas Pfeil, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 689 days.

(21) Appl. No.: 17/812,207

(22) Filed: Jul. 13, 2022

(65) Prior Publication Data

US 2023/0024743 A1 Jan. 26, 2023

(51) Int. Cl.
*G06N 3/082* (2023.01)
*G06V 10/764* (2022.01)
*G06V 10/82* (2022.01)

(52) U.S. Cl.
CPC .......... *G06N 3/082* (2013.01); *G06V 10/764* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 11,847,567 B1* | 12/2023 | Sather | G06N 3/0499 |
| 11,995,555 B1* | 5/2024 | Drimbarean | G06N 3/084 |
| 12,045,725 B1* | 7/2024 | Sather | G06N 3/048 |
| 12,093,816 B1* | 9/2024 | Drimbarean | G06N 3/084 |
| 12,136,039 B1* | 11/2024 | Sather | G06N 3/084 |
| 2018/0107926 A1* | 4/2018 | Choi | G06F 7/582 |
| 2019/0197404 A1* | 6/2019 | Wang | G06N 3/084 |
| 2019/0251447 A1* | 8/2019 | Chen | G06N 3/04 |
| 2020/0285956 A1* | 9/2020 | Bouchard | G06F 17/16 |
| 2021/0019630 A1* | 1/2021 | Yao | G06N 3/047 |

(Continued)

OTHER PUBLICATIONS

Yeom et al., "Pruning by Explaining: A Novel Criterion for Deep Neural Network Pruning," Mar. 12, 2021, https://arxiv.org/abs/1912.08881.*

(Continued)

*Primary Examiner* — Ryan Barrett
(74) *Attorney, Agent, or Firm* — NORTON ROSE FULBRIGHT US LLP

(57) ABSTRACT

A method for generating a simplified computer-implemented neural network. The method includes: receiving a predefined neural network, which includes a plurality of neural network structures and is described by weights, each neural network structure being assigned a pruning vector which describes a change in weights as a result of the pruning of the respective neural network; calculating a product of a matrix including a structure vector, the matrix including partial second order derivations of a loss function with respect to the plurality of weights; determining changes in the loss function with respect to the predefined neural network, each change occurring as a result of a pruning of a corresponding neural network structure of the two or more neural network structures to be pruned; and pruning at least one neural network structure based on the determined two or more changes in the loss function to generate the simplified neural network.

17 Claims, 6 Drawing Sheets

(56) References Cited

U.S. PATENT DOCUMENTS

| | | | |
|---|---|---|---|
| 2022/0114455 A1* | 4/2022 | Samek | G06N 3/084 |
| 2022/0121960 A1* | 4/2022 | Reeb | G06N 3/082 |
| 2024/0054340 A1* | 2/2024 | Rosca | G06N 3/09 |
| 2024/0127123 A1* | 4/2024 | Wang | G06N 20/20 |
| 2025/0077868 A1* | 3/2025 | Li | G06N 3/045 |
| 2025/0148279 A1* | 5/2025 | Drimbarean | G06N 3/04 |

OTHER PUBLICATIONS

Wang et al., "A Convolutional Neural Network Pruning Method Based On Attention Mechanism," Jul. 2019 https://www.researchgate.net/publication/335152374_A_Convolutional_Neural_Network_Pruning_Method_Based_On_Attention_Mechanism, https://ksiresearch.org/seke/seke19paper/seke19paper_147.pdf.*

Nonnenmacher, et al.: "SOSP: Efficiently Capturing Global Correlations by Second-Order Structured Pruning", arXiv:2110.11395V1 [cs.LG] Oct. 19, 2021, pp. 1-24.

Huang et al., "Densely Connected Convolutional Networks," Cornell University, 2018, pp. 1-9. <https://arxiv.org/abs/1608.06993v5> Download Jul. 12, 2022.

Krizhevsky, "Learning Multiple Layers of Features From Tiny Images," Department of Computer Science, University of Toronto, 2009, pp. 1-60. extension://elhekieabhbkpmcefcoobjddigjcaadp/ https://www.cs.toronto.edu/~kriz/learning-features-2009-TR.pdf Download Jul. 12, 2022.

* cited by examiner

EFFICIENT SECOND ORDER PRUNING OF COMPUTER-IMPLEMENTED NEURAL NETWORKS

CROSS REFERENCE

The present application claims the benefit under 35 U.S.C. § 119 of German Patent Application No. DE 10 2021 207 753.6 filed on Jul. 20, 2021, which is expressly incorporated herein by reference in its entirety.

FIELD

The present invention relates to procedures for generating a simplified computer-implemented neural network from a predefined neural network. Associated aspects relate to a computer program and to a computer-implemented system.

BACKGROUND INFORMATION

Computer-implemented neural networks are used increasingly in various technical devices. For many technical applications, the neural networks may include complex structures (for example, including a large number of neurons, layers and corresponding connections). This may place (excessive) demands on the hardware necessary for applying the neural networks. It may therefore be necessary to find a compromise between the efficiency of the computer-implemented neural network and its complexity.

To address the aforementioned problem, so-called pruning methods have been developed. These are aimed on the one hand at reducing the size of the neural networks and at simplifying their overall structure, but on the other hand to maintain a good total capacity of the simplified neural networks (or to adversely affect it as little as possible). The neural networks simplified based on these methods may be used, for example, for smaller technical devices with limited hardware resources (such as for example, electric tools, gardening tools or household appliances). In other examples, it may be necessary to reduce the assessment time of a computer-implemented neural network in order to ensure a sufficiently rapid response of a technical device (for example, of an autonomous robot). For such purpose as well, it may be advantageous to simplify a computer-implemented neural network.

In some pruning methods of the related art, however, the approximations used result in the problem that the total capacity or the accuracy of the neural network generated by the pruning method is diminished as compared to an original neural network. Furthermore, some pruning methods of the related art are unable to predict how, due to possible correlations between the network structures, the pruning of multiple network structures impacts the total capacity of the remaining network structures of the neural network: In many cases, therefore, it is a major effort to prune multiple network structures in the original neural network without adversely affecting the total capacity or the accuracy.

There is therefore a need for new efficient procedures for generating a simplified computer-implemented neural network for a device, which is able to solve some or all of the aforementioned problems.

SUMMARY

One first general aspect of the present invention relates to a method for generating a simplified computer-implemented neural network. In accordance with an example embodiment of the present invention, the method includes the reception of a predefined neural network, which includes a plurality of neural network structures and is described by a plurality of weights. Each neural network structure of the plurality of neural network structures of the first aspect is assigned a pruning vector, which describes a change in the plurality of weights as a result of the pruning of a respective neural network structure. In addition, the method includes the calculation of a product of a matrix including a structure vector, the matrix including partial second order derivations of a loss function with respect to the plurality of weights, each weight of the plurality of weights, which belong to two or more neural network structures to be pruned of the plurality of neural network structures, corresponding to a respective component of the structure vector. In a next step, the method of the first aspect includes the determination of two or more changes in the loss function with respect to the predefined neural network, each change of the two or more changes occurring as a result of a pruning of a corresponding neural network structure of the two or more neural network structures to be pruned. In addition, the determination of the two or more changes in the loss function is carried out using the calculated product, the respective pruning vectors and the instantaneous plurality of weights of the predefined neural network. Finally, the method includes the pruning of at least one neural network structure of the plurality of neural network structures based on the determined two or more changes in the loss function, in order to generate the simplified neural network.

One second general aspect of the present invention relates to a computer program, which is designed to carry out the computer-implemented method according to the first general aspect of the present invention.

One third general aspect of the present invention relates to a computer-implemented system for generating and/or applying a computer-implemented neural network for a device, which is designed to carry out the method according to the first general aspect of the present invention. In addition or alternatively, the computer-implemented system of the third general aspect is designed to execute the computer program according to the second general aspect of the present invention.

The procedures of the first through third general aspects may have one or multiple of the following advantages.

First of all, the present procedures may make it possible to generate a simplified smaller-sized neural network (for example, including a smaller number of neurons and/or connections and/or layers) as compared to the original predefined neural network. In this case, a loss of total capacity or accuracy of the generated simplified neural network should not be too great (and ideally, no loss of total capacity or accuracy should occur). Such simplified (pruned) computer-implemented neural networks of the present procedures may be suitable for technical devices that include relatively few hardware resources (for example, portable electric devices or devices with no constant network connection) or in technical environments, in which a higher calculation and assessment speed is useful (for example, in at least semi-autonomous vehicles). Such a pruned neural network may thus be adapted to a calculation and assessment speed, in particular, for these resource-saving technical environments and/or for technical environments with increased requirements.

Secondly, the procedures of the present description offer the possibility, in particular, in complex neural networks, of estimating better and more quickly than in some procedures of the related art which neural network structures make a small or even negligible contribution to the total capacity of the original predefined neural network.

Thirdly, the present procedures use no rough approximations (for example, using a diagonal matrix or nearly a diagonal matrix for a respective Hessian matrix), as is the case in several conventional methods of the related art. As a result, the present procedures may make it possible to determine more efficiently and exactly the network structures to be pruned as compared to several methods of the related art.

Several terms are used in the present description in the following way:

The term "neural network" is understood to mean any artificial neural network, which may include a particular topology and a number of neurons with corresponding connections (see also the following discussions). According to several specific embodiments, the neural network may be a convolutional neural network or, in short, "CNN", which is defined, for example, by the number of filters, filter sizes, step sizes, etc. A convolutional neural network may, for example, be used for the purpose of image classification and may carry out one or multiple transformations on digital images, which are based, for example, on convolution, non-linearity (ReLU), pooling or classification operations (for example, using the fully-connected layers). The neural network may also be designed as a multilayer feedforward or recurrent network, as a neural network including direct or indirect feedbacks or as a multilayer perceptron. These neural networks may be used in a vehicle computer or in another component of a vehicle or in an at least semi-autonomous robot (for example, for assessing an operating state of the vehicle or robot and/or for controlling a function of the vehicle or robot based on state data and/or surroundings data of the vehicle or robot as input data). The list of examples is not exhaustive (further examples are also presented further below).

Accordingly, the term "network structure" (hereinafter sometimes also referred to in short as "structure"), as explained further below, includes an arbitrary subset of elements of the neural network, for example, neurons with their respective weights and/or connections, which may be situated in one or in multiple layers of the neural network. A network structure may also include an (entire) layer of the neural network.

The term "pruning ratio" of a neural network is understood to mean any magnitude, which may characterize the extent to which a pruned neural network has been changed as compared to an original neural network (for example, with respect to a number of pruned or remaining neural network structures or to a desired total capacity of a pruned neural network). The pruning ratio of a neural network may, for example, be defined as a ratio between a number of neural network structures, which are pruned from the neural network, and an (original) number of neural network structures of the neural network.

The term "randomly initialized neural network" means that initial weights for a neural network are selected as random numbers or are initialized by different values (for example, in order to break a symmetrical distribution with respect to the initial weights of the neural network).

Accordingly, a "trained neural network" is a neural network, which is trained, for example, by carrying out a stochastic gradient descent method or another method using one data set (in the present description, also referred to as training data set) or multiple data sets (for example, with respect to sensor data) in such a way that a corresponding loss function is minimized through training (within the scope of a predetermined numerical accuracy and/or until a predetermined abort criterion is achieved). In this context, the term "partially trained neural network", as explained in further detail below, is understood to mean a neural network, whose corresponding loss function, for example, has not yet been minimized through training (within the predetermined numerical accuracy and/or for achieving a predetermined abort criterion). For example, a "randomly initialized neural network" may be trained to become a "(partially) trained neural network."

The term "device" below relates to all devices, for the control and/or monitoring of which a computer-implemented neural network may be employed/used, such as for example, a vehicle (for example, a motor vehicle such as an at least semi-autonomously operating/assisted motor vehicle or a ship, a train, an aircraft or a spacecraft), a vehicle computer, a semi-autonomous or fully autonomous robot (for example, an industrial robot or a machine) or a group thereof (for example, an industrial facility), a tool, a household appliance or a gardening tool, a monitoring device (further examples are also presented further below). For example, a computer-implemented neural network may be used in these devices in order to classify or otherwise assess state data or surroundings data (for example, image data) which are collected for the device (for example, by corresponding sensors). The classification result or assessment result may be used for controlling and/or for monitoring the device.

BRIEF DESCRIPTION OF THE DRAWINGS

FIG. 3A shows a simplified randomly initialized neural network is initially generated by being pruned from the randomly initialized neural network and then trained 10a; FIG. 3B shows a randomly initialized neural network is initially trained and a simplified trained neural network is subsequently generated by being pruned from the trained neural network. Finally, the generated simplified trained neural network is (further) trained 10b; FIG. 3C shows a randomly initialized neural network is initially trained and two or more neural network structures to be pruned of the trained neural network are subsequently determined. The randomly initialized neural network is then pruned and generated based on the determined two or more neural network structures to be pruned of the trained neural network, Finally, the generated simplified randomly initialized neural network is trained 10c; FIG. 3D shows two or more neural network structures to be pruned of a randomly initialized neural network are initially determined and the randomly initialized neural network is trained. The corresponding trained neural network is then pruned based on the determined two or more neural network structures to be pruned of the randomly initialized neural network and a simplified trained neural network is generated. Finally, the generated simplified trained neural network is (further) trained 10d.

The labeling "NN" refers to a corresponding neural network. The labeling "mask" symbolically refers to two steps of the method, in which network structures to be pruned for a neural network are ascertained (incoming arrows into the block "mask") and applied to a corresponding neural network (outgoing arrows into the block "mask"), see the description further below.

Figure 3A:
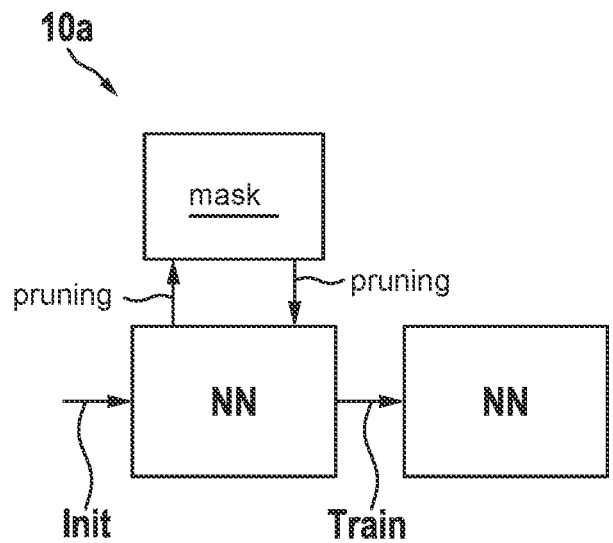
FIGS. 3A through 3D schematically show four possible different pruning scenarios of the present procedures.
Figure 3B:
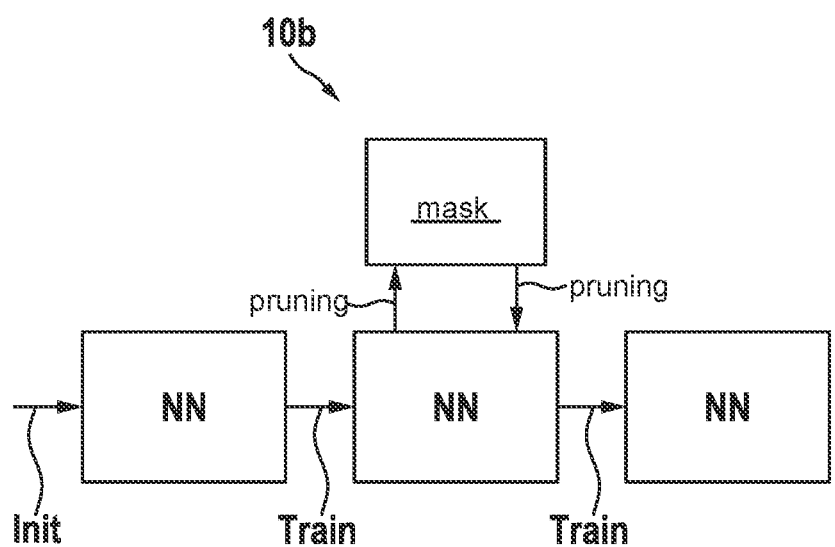
Figure 4:
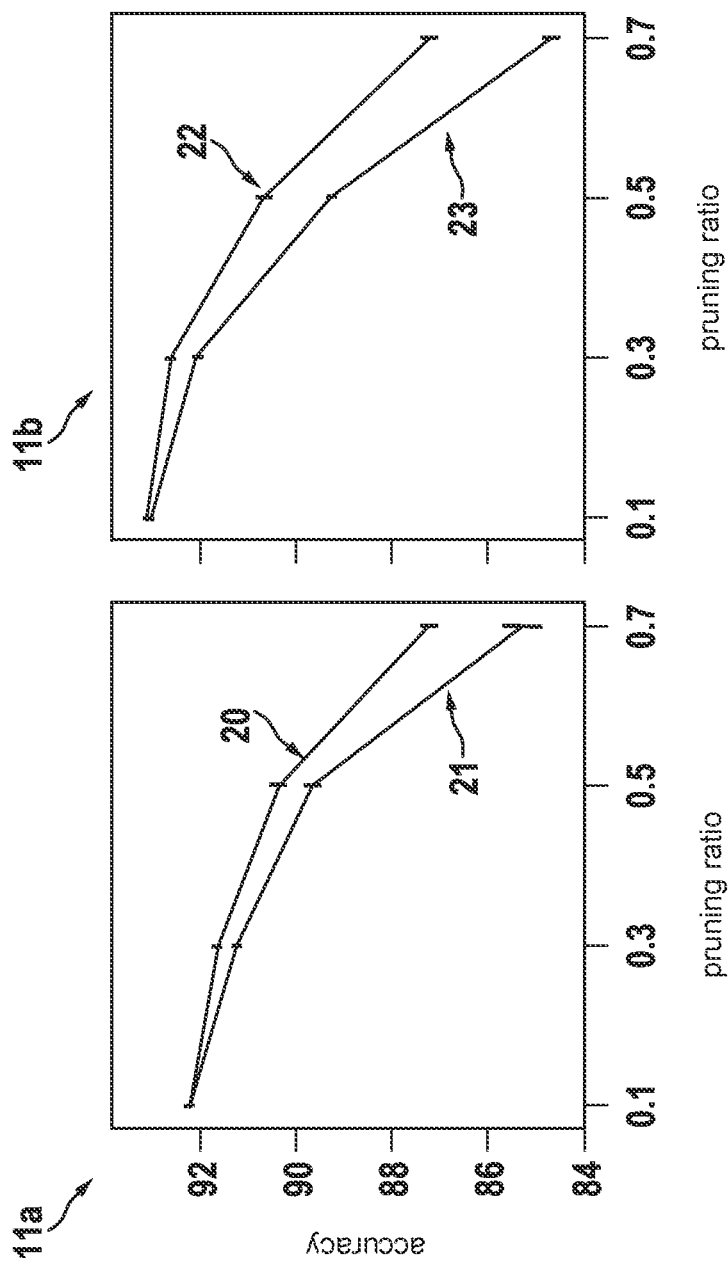

FIG. 4 shows a mean value of classification accuracy 20, 22 for the pruning methods used in FIGS. 3A and 3B and of the errors of this mean value (vertical bars; 3 tests have been used) as a function of different values of the pruning ratio. The results of the present procedures are compared with respective results 21, 23 of a random pruning method, which selects structures to be randomly pruned (using a uniform distribution) from the plurality of neural network structures, until a desired pruning ratio (the x-axis in FIG. 4) is achieved. The methods of the first aspect are applied to the convolutional neural network "DenseNet-40 BC" using the "Cifar10" data set.

Figure 5:
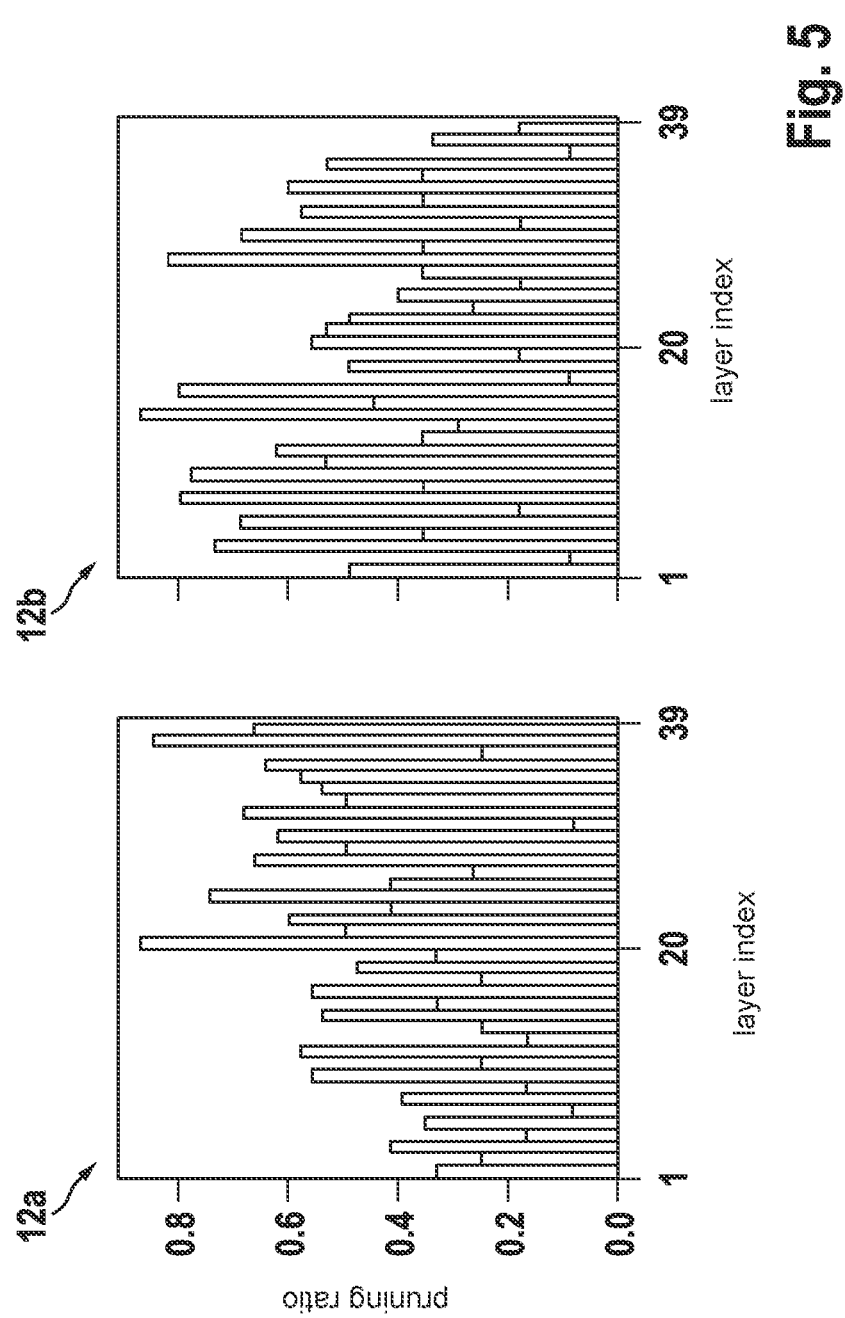

FIG. 5 represents a distribution of the layer pruning ratio in initialization 12a (corresponds to the scenario shown in FIG. 3A) and after training 12b (corresponds to the scenario shown in FIG. 3B) as a function of the layer index of the convolutional neural network "DenseNet-40 BC" for a test from FIG. 4. (The layer index numbers layers of the convolutional neural network "DenseNet-40 BC", which contains multiple layers). The pruning ratio of the plurality of neural network structures of the convolutional neural network "DenseNet-40 BC" is 50% as exemplified in FIG. 4 (this corresponds to the value 0.5 on the x-axis of FIG. 4).

DETAILED DESCRIPTION OF EXAMPLE EMBODIMENTS

Procedures for generating a simplified computer-implemented neural network are initially described with reference to FIGS. 1A through 1C. A neural network predefined by way of example before and after the pruning as well as a pruning vector $\delta_p$ are then discussed with reference to FIGS. 2A and 2B. Next, four exemplary pruning scenarios of the present procedures are schematically shown in FIGS. 3A through 3D. Finally, FIGS. 4 and 5 will illustrate further aspects relating to the pruning method of the present description.

Figure 1A:
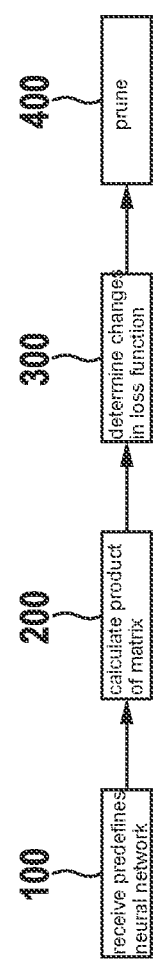
FIG. 1A is a flowchart, which represents one example of a method for generating a simplified computer-implemented neural network according to the first aspect of the present invention.
Figure 1B:
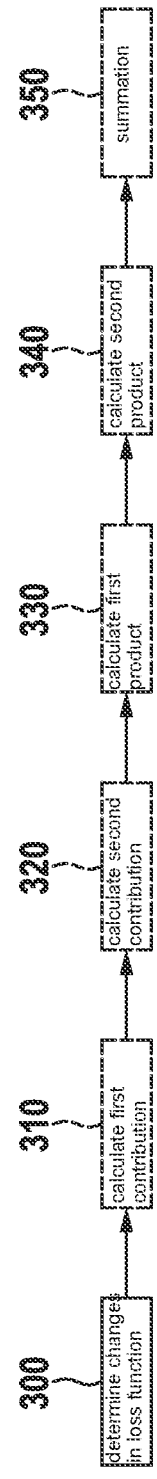
FIGS. 1B and 1C are flowcharts, which show further possible method steps according to the first aspect of the present invention.
Figure 1C:
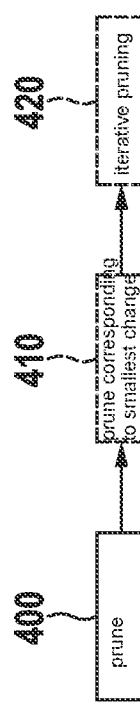

As outlined in FIGS. 1A through 1C, one first general aspect relates to a method for generating a simplified computer-implemented neural network. As explained in greater detail below, a simplified neural network is a smaller-sized neural network (for example, including a smaller number of neurons, and/or connections and/or layers) as compared to an original neural network, from which it is generated. For example, the simplified neural network may contain 90% or less, 70% or less, 50% or less, 30% or less of the number of neurons, and/or connections and/or layers of the original neural network.

Figure 2A:
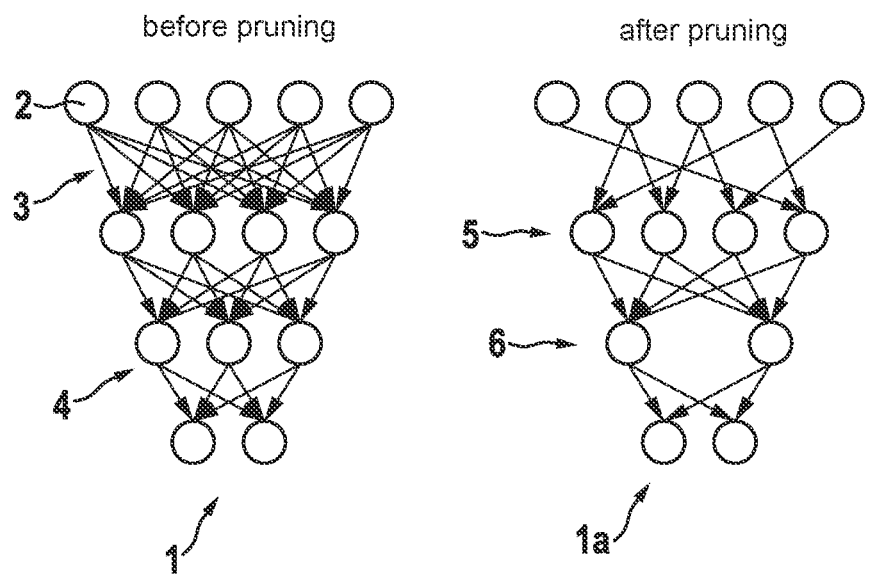
FIG. 2A schematically shows a predefined neural network before and after the pruning (simplifying). Neurons 2 and their connections 3 are represented as nodes (circles) or edges (arrows).

An exemplary neural network 1 is (schematically) outlined in FIG. 2A. The neural network may be made up of a plurality of neurons (an exemplary neuron 2 is highlighted in FIG. 2A), which form nodes of neural network 1 and are connected to one another via edges 3. The neurons of the computer-implemented neural networks of the present description are arranged in multiple layers (for example, third layer 4 of FIG. 2A contains three neurons). In the present description, the edges or connections which lead to the neurons (or nodes) are considered as part of the respective layer (i.e., the input connections and the nodes are situated in the same layer). A computer-implemented neural network may include one or more, three or more, or five or more layers. The neurons and their connections may have different structures and may be represented with the aid of a graph as nodes or edges. As mentioned above, an arbitrary subset of elements of the neural network is referred to as a "neural network structure". In some examples, a neural network structure may contain one or multiple edges, one or multiple nodes or a combination of one or multiple nodes and edges (for example, one node and the edges leading toward and away from the node). Networks other than those shown in FIG. 2A may contain additional elements (for example, feedbacks or memories). These elements as well may be a neural network structure or part of such a network structure. In other examples, an element of the neural network may be a parameter for describing the neural network (this aspect is explained in greater detail below).

The output of a particular neuron j may be a function of applied inputs of one or multiple neurons i. In particular, a sum of the weighted applied inputs may be initially formed for neuron j, where a weight in the form $\theta_{ij}$ of neuron j to neuron i may be defined for all neurons. ($\theta_{ij}=0$ may mean that neuron j has no connection to neuron i). Finally, the output of neuron j may be ascertained after the application of an activation function defined for the respective neuron to the previously calculated sum. In some examples, a neural network may therefore be defined by specifying its topology and/or weights $\theta_{ij}$ for all neurons. The weights may thus also be elements of a neural network structure within the context of the present description. This means, a neural network structure may contain one or multiple weights of the neural network (which may correspond to one or to multiple edges of the graphic description of the neural network). According to the language version introduced above, all weights of connections or edges, which lead to nodes or neurons of a particular layer, belong to this layer. The weights of the output edges or output connections of this particular layer belong to another layer.

The computer-implemented neural network may be created and trained for use in a device (for example, be fully or partially trained), in order to process data (for example, sensor data) accumulating in this device and, for example, to calculate output data to be used for the monitoring and/or control of the device (particular applications of the computer-implemented neural networks are discussed further below). Thus, the properties of this device or its responses to particular events may ultimately be "hidden" in the topology and weights $\theta_{ij}$ of the neural network. In other examples, a neural network may also be described by other and/or additional parameters than weights $\theta_{ij}$. In the present description, weights $\theta_{ij}$ are discussed as exemplary parameters.

Some methods used in the related art for pruning network structures from trained neural networks proceed in the following manner: After generation of a neural network, whose topology is a function of its task, weights $\theta_{ij}$ may be selected accordingly. In some examples, the selection of these weights may be referred to as training or learning the neural network, starting from a random initialization of the weights. This step is carried out on a computer system.

During a "supervised learning", a plurality of input data $x_k$ (for example, sensor data) and a corresponding plurality of desired output data $y_k$ (for example, a state of a technical device or its surroundings or a control variable) are available (i.e., the input data and output data each form a pair). The data set, which is formed in each case from N pairs $(x_k, y_k)$ k=1, . . . , N, is referred to as a training data set. The training of the neural network may be formulated as an optimization problem, in which weights $\theta_{ij}$ of the neural network must be adapted in such a way that output $f_\theta^{NN}(x_k)$ generated by the neural network for given input $x_k$ (where $f_\theta^{NN}$ is a transfer function of the neural network for a parameter set $\theta$, for example, a set of weights) is as close as possible to desired output $y_k$. This optimization problem may be represented as a minimization of a loss function $L_D$ (in this description, mention is made of a minimization of the loss function, even though this corresponds in some cases to a maximization of an expression). The loss function may assume various forms. In one example, the loss function is a function of the mean squared error ("MSE"), for example:

$$\min(L_D) = \min \frac{1}{2N} \sum_{k=1}^{N} \left(f_\theta^{NN}(x_k) - y_k\right)^2,$$

The minimization may be carried out with respect to all weights $\theta_{ij}$. As a result of this minimization, trained weights $\theta_{ij}^{Tr}$ are determined and thus a trained neural network or partially trained neural network in the sense described above are generated. The aim of this training is not only to reproduce desired output data $f_\theta^{NN}(x_k) \approx y_k$ in the training phase, but also to be able to provide plausible output data (i.e., unknown output data) for further input data $x_k$.

The trained neural network may have a complex topology and a large number of neurons and connections (for example, $10^4$ or more, or $10^5$ or more connections) and may therefore create high and undesirable demands on hardware during the calculation. As explained further above, this complex neural network is initially simplified with the aid of the pruning methods, so that it may be used in the corresponding device. A simplified (pruned) neural network 1a is shown on the right-hand side of FIG. 2A. For example, multiple edges (connections) have been pruned between the uppermost and underlying layer 5. In addition, a node together with associated edges has been pruned in next to last layer 6.

This simplification may include an analysis of the respective changes in loss function $L_D$ by the pruning of one or multiple neural network structures. The pruning of a structure may include the removal of one or of multiple connections (i.e., edges) between neurons and/or the complete removal of one or of multiple neurons together with their incoming and outgoing connections. In other cases (or in another image), the pruning may include the removal or the setting to zero of one or of multiple weights (which may be an alternative description for the removal of one or of multiple connections or edges). In other cases, neural networks may include elements going beyond the structures shown in FIG. 2A (for example, feedbacks or memories) These network structures as well may be pruned using the methods of the present description.

In this case, changes in the loss function may in some examples be approximated up to a particular order based on the pruning of structures by a Taylor development of loss function $L_D$ with respect to weights $\theta_{ij}$. For example, a development of the following form may be provided:

$$\delta L_D(\theta) \approx \frac{\partial L_D(\theta)}{\partial \theta} \delta\theta + \frac{1}{2} \delta\theta^T H(\theta) \delta\theta + \ldots.$$

Here, $\delta\theta$ is an interference vector around a given weight vector $\theta$ of a predefined neural network (for example, of a trained neural network including weights $\theta_{ij}^{Tr}$ or a randomly initialized neural network including weights $\theta_{ij}^{Zuf}$), which reflects corresponding changes in the weights, for example, $\theta_{ij}^{Tr} + \delta\theta_{ij}$ after the pruning. $\delta\theta^T$ forms as a result of the transposition of $\delta\theta$.

Figure 2B:
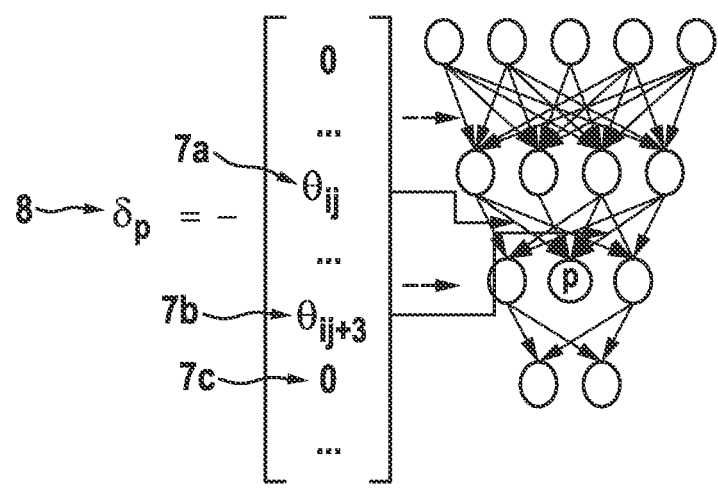
FIG. 2B schematically shows a pruning vector 8; $\delta_p$, which relates here to node p of the neural network and describes a change in the instantaneous weights as a result of the pruning of the connections of node p (all components of the pruning vector are set to zero, except for those of 7a, 7b, which correspond to the weights that belong to node p to be pruned).

$H(\theta) = \partial^2 L_D / \partial^2 \theta$ is the Hessian matrix, which is made up of partial second order derivations of loss function $L_D(\theta)$ with respect to weights $\theta_{ij}$, which are calculated in this example for trained weights $\theta_{ij}^{Tr}$. In this case, $\partial L_D(\theta)/\partial\theta = 0$ is applicable (at least approximately) to the trained network, because $\delta L_D(\theta)$ includes a minimum for trained weights $\theta_{ij}^{Tr}$ (at least approximately within the scope of a predetermined numerical accuracy). The terms of higher order as the second order in the Taylor development may be disregarded. The changes in the loss function are then provided by $\delta L_D(\theta) \approx 1/2 \delta_p^T H(\theta) \delta_p$. As illustrated in FIG. 2B, $\delta_p^T$ corresponds to a pruning vector of weights $\theta_{ij}^{Tr}$ for the corresponding structure (for example, for node p). In this case, the pruning vector describes a change in the instantaneous weights as a result of the pruning of one or of multiple connections of node p. Pruning vectors may also be defined for other network structures (for example, for a combination of two or multiple nodes with corresponding incoming edges, the nodes lying within various layers or within one layer or the nodes being adjacent nodes). In other examples, if the predefined neural network is selected as a randomly initialized neural network or a partially trained neural network, the first derivations of the loss function may deviate from zero according to their weights, $\partial L_D(\theta)/\partial\theta$ (within the scope of a predetermined numerical accuracy).

The formula for the Taylor function of loss function $L_D$ is represented only as an example and may also assume another expression depending on the selected standardizations for the respective vectors (for example, the factor ½ may be included in the second term of the Tayler development shown above in $\delta\theta$ and $\delta\theta^T$).

The changes in the loss function for the case in which multiple neural network structures are pruned, may be represented as the sum of a plurality of components of the matrix, which describes changes in a loss function as a result of the pruning of one or of multiple of neural network structures of the plurality of neural network structures. For example, the changes in the loss function may be determined in the following form: $\delta L_D(\theta) \approx 1/2 \Sigma_{prun.\, pq} Q_{pq}$, where matrix $Q_{pq}$ is defined as $Q_{pq} = \delta_p^T H(\theta) \delta_q$. Running indices p and q in the sum run from 1 to S, S referring to the total number of network structures. Hessian matrix $H(\theta)$ is made up of partial second order derivations $\partial^2 L_D/\partial^2(\delta\theta_{ij})$, and this matrix therefore generally has the non-diagonal components (i.e., the cross terms), which may be not negligibly small. This may be explained by the fact that loss function $L_D$ may be a non-linear function with respect to weights $\theta_{ij}$. Consequently, matrix $Q_{pq}$, which is defined by Hessian matrix $H(\theta)$, may also have a non-diagonal form.

Despite the apparently simple expression for the changes in the loss function, there may be some difficulties in the calculation of $\delta L_D(\theta)$. First of all, dimension P×P of Hessian matrix $H(\theta)$ (and consequently matrix $Q_{pq}$) is normally very large, P referring to the total number of connections in a neural network. For this reason, the Hessian matrix in several conventional methods of the related art is approximated by a diagonal matrix (or nearly a diagonal matrix). However, this approximation disregards possible correlations between the network structures, for example, between an individual network structure and all other network structures of the plurality of neural network structures (this aspect is explained in greater detail further below). This may, however, result in (in part considerable) inaccuracies in the estimation, as to which of the network structures have an influence on the efficiency of the neural network. Secondly, the calculation of $\delta L_D(\theta)$ includes a large number of calculation steps on a computer-implemented system, which scales with the number of training data sets N and dimension P of pruning vector $\delta_p$ according to $O(N \cdot P^2)$. Moreover, the number of calculation steps becomes fully independent of the fact that respective dimension L for a network structure, whose pruning is taken into account, may be significantly smaller than the total number of connections in a neural network P. As a result, the aforementioned estimation for complex structures with large P may become computationally difficult to carry out. Thirdly, the problem may also arise that the training of neural networks (in particular, of those that are relatively large and complex) may be a computationally very complex and therefore laborious task. These problems may be addressed in some implementations by the procedures of the present description.

The first step of the method for generating a simplified computer-implemented neural network of the present description includes reception 100 of a predefined neural network 1, which contains a plurality of neural network structures S and is described by a plurality of weights 7a, 7b. For example, predefined neural network 1 may include a plurality of neural network structures S in one or in multiple layers 4 through 6. In some examples, the plurality of neural network structures forms the predefined neural network. In other examples, the plurality of neural network structures forms a part of the predefined neural network (for example, one or multiple neurons with respective connections, the input layer or output layer, one or multiple intermediate layers or a combination thereof may belong not only to the plurality of neural network structures). In the present procedures, each layer may be provided, for example, by a plurality of neurons and corresponding incoming connections. In this case, a weighted output of a neuron, which is situated in one layer, may be an input of another neuron, which may be situated in another layer. For example, neural network 1 according to FIG. 2A contains four layers. For the predefined neural network, an instantaneous number of weights $\theta_{ij}^{Ak}$ may be provided, which are provided by corresponding numerical values.

In some cases, a randomly initialized neural network may be selected as the predefined neural network (see the following discussions for further details). In some cases, the predefined neural network may be a trained neural network. In other cases, the predefined neural network may be a partially trained neural network. In some cases, a partially trained neural network may have run through merely a fraction of the training rounds (for example, fewer than 100 training rounds or fewer than 20 training rounds) required for complete training (so-called epochs, which may represent a complete training iteration via a training data set, for example, including carrying out a "stochastic gradient descent" or another method). The pruning methods of the present description may be advantageous in several examples of partially trained neural networks. A training effort may be reduced as a result of the "early" pruning.

In the procedures of the present description, each neural network structure of the plurality of neural network structures may be assigned a pruning vector, $\delta_p$, which describes a change in the plurality of weights as a result of the pruning of a respective neural network structure. In other words: pruning vector $\delta_p$ takes into account that the pruning of a corresponding structure p changes an architecture of the predefined network, for example, due to the change in an output of a neuron (i.e., of a node) as a result of the pruning of one or of multiple connections (i.e., edges), which lead into it. Furthermore, pruning vector $\delta_p$ may take into account that such a change in the node may further propagate in the neural network (for example, to another neuron of the same or of another layer), because one or multiple changed outputs of the neuron may be corresponding inputs of one or of multiple other neurons. In some examples, each pruning vector of a corresponding neural network structure to be pruned may contain weights from the plurality of weights, which belong to the corresponding network structure to be pruned, as components 7a, 7b. In addition, corresponding other components 7c of the pruning vector may be set to zero, which correspond to weights that do not belong to the corresponding network structure to be pruned. This situation is represented by way of example, in FIG. 2B.

In one further step of the method according to the present invention, a product $(H(\theta)\delta_{struc})$ of a matrix (for example, of a Hessian matrix $H(\theta)$ introduced above) including a structure vector $\delta_{struc}$ is calculated 200, the matrix including partial second order derivations of a loss function $L_D(\theta)$ with respect to the plurality of weights. In addition, each weight of the plurality of weights, which belong to two or more neural network structures to be pruned of the plurality of neural network structures, may correspond to a respective component of structure vector $\delta_{struc}$ (for example, each component of the structure vector may be proportional to a respective weight). In addition, the present procedures include determination 300 of two or more changes $\lambda_p$ in the loss function with respect to the predefined neural network, each change of the two or more changes occurring as the result of a pruning of a corresponding neural network structure of the two or more neural network structures to be pruned. In other words: the two or more changes $\lambda_s$ are assigned to respective two or more corresponding network structures to be pruned. Furthermore, in some examples, the two or more neural network structures to be pruned may be located within various layers of the predefined neural network. In addition or alternatively, two or more neural network structures of the plurality of neural network structures may be situated within a (single) layer of the predefined neural network. In some examples, a number of two or more neural network structures M to be pruned may be smaller than a number of neural network structures in the plurality of neural network structures S, M<S (for example, a corresponding ratio M/S may have a value of 0.9 or less, 0.5 or less, 0.1 or less). In other examples, the number of two or more neural network structures M to be pruned may be selected to be equal to the number of neural network structures in the plurality of neural network structures S, M=S.

In addition, the determination of two or more changes in the loss function may be carried out using the calculated product, the respective pruning vectors and the instantaneous plurality of weights $\theta_{ij}^{Ak}$ of the predefined neural network (for example, the corresponding numerical values as mentioned above). Furthermore, the method may include in some cases the reception of a data set X, which describes a behavior of a device, data set X being made up of a plurality of pairs X={($x_i$, $y_i$)|i≤n}. Each pair may be formed, for example, from input data and respective output data, the predefined neural network generating the respective output data for the input data of each pair. In some examples, this step of the method may be necessary in order to determine the two or more changes in the loss function, as follows from the above written exemplary expression for loss function, min($L_D$). For example, the data set may ultimately be used in respective expressions for the two or more changes in the loss function.

In this context, data set ($x_k$, $y_k$) may contain data of a different type, in each pair, input data $x_k$ and output data $y_k$ being combined in each case to form a pair (k=1 . . . N). For example, a piece of input data and a piece of output data may each be a scalar (for example, a scalar measured value), a vector of arbitrary length (i.e., with a length of one or greater) or a matrix. The input data may represent environmental influences or internal operating states of a device. In one example, the input data may include sensor data. Alternatively or in addition, the input data may include image data and/or audio data. The output data may be a state of the device or of the surroundings or of a recognized event of the device or of the environment (for example, the state "battery almost empty" or "it's raining" for an electrical device). In further examples, the output variable may be a control variable (for example, for an actuator) or may otherwise identify a response of the device. In each case, the output data may be used for controlling (for example, the selection of an operating parameter or of an operating mode of the device) and/or for monitoring the device.

The procedures of the present description finally include pruning 400 of at least one neural network structure of the plurality of neural network structures based on the determined two or more changes in the loss function, in order to generate simplified neural network 1a. In some examples, values of the determined two or more changes in the loss function may be used in order to decide which neural network structures make a minimal or even negligible contribution to a total capacity of the original predefined neural network (for example, total capacity drops by no more than a predetermined measured value). In this context, for example, only those network structures may be categorized as the network structures to be pruned, which cause no increase in the loss function $\delta L_D(\theta)$ or only an increase not exceeding a particular degree after the pruning. The network structures thus categorized may therefore be pruned from the predefined neural network, in order to enable the generation of a simplified neural network for the device. The resultant simplified neural network may provide data faster for a device and/or may require fewer hardware resources.

In the present procedures, the matrix may be a Hessian matrix $H(\theta)$, which contains the partial second order derivations of a loss function $L_D(\theta)$ with respect to the plurality of weights. In this case, the product may be a Hessian vector product of the Hessian matrix with structure vector $\delta_{struc}$. In the present description, the determination of a respective change of the two or more changes in the loss function, which occurs as the result of the pruning of a respective neural network structure of the two or more neural network structures to be pruned, may include the calculation 310 of a respective first contribution via the calculation of a scalar product of pruning vector $\delta_p$, which is assigned to the respective neural network structure, with the calculated product (for example, with the aforementioned Hessian vector product). As discussed above, each component of the structure vector may be proportional to the respective weight, each weight of the plurality of weights, which belong to the two or more neural network structures to be pruned, corresponding to the respective component of structure vector $\delta_{struc}$. The vector structure in several examples may thus be written as a weighted sum of the pruning vectors, $\delta_{struc}=\Sigma_{q\in M}\mu_q\delta_q$, which belongs to the two or more neural network structures to be pruned. In this case, $\mu_q$ are corresponding weight factors and M is a number of two or more neural network structures to be pruned. In some cases, all weight factors may be identical, for example, $\mu_q=1$. In this case, the structure vector may be written as a sum of the pruning vectors, $\delta_{struc}=\Sigma_{q\in M}\delta_q$, which belong to the two or more neural network structures to be pruned. Furthermore, the structure vector may in some cases be approximated by a sum of all pruning vectors of the plurality of neural network structures (S), $\delta_{struc}=\Sigma_{q=1}^{S}\delta_q$, if for example, the ratio between the number of two or more neural network structures to be pruned and the number of neural network structures in the plurality of neural network structures, M/S, exceeds a predefined threshold value (for example, M/S is 0.1 or greater, 0.5 or greater, 0.8 or greater), which corresponds to a high pruning ratio (see also discussions further below). It should be noted that the scalar product thus defined may take correlations between an individual network structure $\delta_p$ to be pruned (for example, each individual network structure to be pruned) and all other network structures of the plurality of neural network structures into account, since structure vector $\delta_{struc}$, due to its construction, contains pieces of information about the plurality of neural network structures. In this way, the determination of each change from the two or more changes in the loss function may include in some examples the calculation of the respective first contribution.

The first contribution defined in the present description may approximately describe a second order contribution in the above discussed Tayler development of loss function $L_D$ with respect to weights $\theta_{ij}$ for respective change $\lambda_p$ in the loss function. In addition, as mentioned above, the matrix introduced above may in some cases be Hessian matrix $H(\theta)$, so that the product is the Hessian vector product of the Hessian matrix with structure vector $\delta_{struc}$. Thus, in several examples, the first contribution to respective change $\lambda_p$ in the loss function due to the pruning of network structure p by the above defined scalar product of pruning vector $\delta_p$, which is assigned to the respective neural network structure, may be provided with Hessian vector product $\delta_p^T(H(\theta)\delta_{struc}$. ($\delta_p^T$ is formed by the transposition of pruning vector $\delta_p$). In other examples, the first contribution to respective change $\lambda_p$ in the loss function due to the pruning of network structure p may be provided by the amount of scalar product $|\delta_p^T(H(\theta)\delta_{struc})|$ introduced above. The occurring Hessian vector product may be efficiently calculated, for example, by a back propagation algorithm conventional in conjunction with artificial neural networks. In the present procedures, the instantaneous plurality of weights $\theta_{ij}^{Ak}$ of the predefined neural network (for example, the corresponding numerical values as mentioned above) may be subsequently used in the first contribution for the calculation of the first contribution.

In addition, the step "determination" 300 the two or more changes in the loss function may further be carried out using a gradient $\partial L_D(\theta)/\partial\theta$ of respective two or more pruning vectors $\delta_p$ and of the instantaneous plurality of weights of predefined neural network $\theta_{ij}^{Ak}$, where gradient $\partial L_D(\theta)/\partial\theta$ may include the first derivations of the loss function according to their weights. In some cases, as already mentioned above, gradient $\partial L_D(\theta)/\partial\theta$ after an insertion of instantaneous weights $\theta_{ij}^{Ak}$ may be negligibly small (at least approximately within the scope of a predetermined numerical accuracy), if the predefined neural network is a trained neural network. In other cases, when for example the predefined neural network is a partially trained neural network (in the sense introduced above) or a randomly initialized neural network, gradient $\partial L_D(\theta)/\partial\theta$ may assume a value, which differs significantly from zero (within the scope of a predetermined numerical accuracy). In addition, the determination of a respective change from the two or more changes in the loss function, which occurs as the result of the pruning of a respective neural network structure of the two or more neural network structures to be pruned, may include the calculation 320 of a respective second contribution as the result of the calculation of a scalar product of pruning vector $\delta_p$, which is assigned to the respective neural network structure, and the gradient, $\partial L_D(\theta)/\partial\theta$. Thus, in several examples, the second contribution to respective change $\lambda_p$ in the loss function due to the pruning of network structure p may be provided by scalar product $\delta_p^T \partial L_D(\theta) \partial \theta$, $\delta_p^T$ being formed by the transposition of pruning vector $\delta_p$. In other examples, the second contribution to respective change $\lambda_p$ in the loss function due to the pruning of network structure p may be provided by the amount of scalar product, $|\delta_p^T \partial L_D(\theta)/\partial\theta|$, introduced above. In addition, the instantaneous plurality of weights of predefined neural network $\theta_{ij}^{Ak}$ may be subsequently inserted into the second contribution. In some examples, the determination of each change from the two or multiple changes in the loss function may include the calculation of the respective second contribution.

In some examples of the present procedures, respective change $\lambda_p$ of the two or more changes in the loss function due to the pruning of network structure p may be proportional to or equal to the respective first contribution. In other examples, respective change $\lambda_p$ may be proportional to or equal to the amount of the first contribution. As explained above, this may be the case if gradient $\partial L_D(\theta)/\partial\theta$ is negligibly small and thus the respective second contribution may be disregarded as opposed to the respective first contribution. In still other examples, the determination of a respective change of the two or more changes in the loss function may include calculation 330 of a first product by multiplying the respective first contribution by a first weight factor. In a next step, the step "determination" may include calculation 340 of a second product by multiplying the respective second contribution by a second weight factor. In addition, the step "determination" may include summation 350 of the amount of the first product with the amount of the second product, in order to calculate the respective change. In this case, the respective change in the loss function due to the pruning of network structure p may be provided by the following formula:

$$\lambda_p = |\alpha \delta_p^T H(\theta)\delta_{struc}| + |\beta \delta_p^T \partial L_D(\theta)/\partial\theta|$$

where $\alpha$ and $\beta$ are the corresponding first and second weight factors. In some examples, an identical first weight factor and an identical second weight factor are used for determining each change of the two or more changes in the loss function. The values of the weight factors may, for example, be derived for the respective vectors depending on the selected standardizations. In addition, the contributions of the first contribution and of the second contribution to respective change $\lambda_p$ may be controlled by the values of the weight factors in order, for example, to change (for example, to strengthen or to weaken) the influence of the first contribution relative to the second contribution. In one specific non-exhaustive example, the respective change may be provided by $\lambda_p = 1/2|\delta_p^T H(\theta)\delta_{struc}| + |\delta_p^T \partial L_D(\theta)/\partial\theta|$. In still alternative examples, the step "determination" may include summation 350 of the first product with the second product in order to calculate respective change $\lambda_p$.

In the present description, the step "pruning" further includes, based on the determined two or more changes in the loss function, pruning 410 of a neural network structure, which corresponds to the smallest change of the two or more changes in the loss function. In some examples, the two or more changes may be initially arranged for this purpose (for example, in ascending or descending order). The method according to the present invention next includes iterative pruning 420 of the corresponding two or more neural network structures of the two or more neural network structures to be pruned, each neural network structure to be subsequently pruned corresponding to a next larger value of the two or more changes (for example, of the arranged two or more changes). In general, the iterative pruning may be carried out until a size of the simplified neural network falls below a desired size. In one example, the desired size may be provided by a minimum number of neurons in the simplified neural network or within a layer of the simplified neural network. In other examples, the desired size may be defined by a minimum number of connections between neurons in the simplified neural network or by a minimum number of connections between neurons within a layer of the simplified neural network. The desired size may also be provided, for example, as a minimum number of unpruned layers or structures of the simplified neural network. In other examples, the pruning methods are carried out until a total capacity of the simplified neural network falls below a predefined threshold value. For example, the total capacity may be estimated with the aid of accuracy (for example, the accuracy of a classification result) (see, for example, FIG. 4) which, in turn, may be calculated based on the loss function. In one example, the predefined threshold value may be defined as the ratio between the total capacity of the simplified and of the predefined neural network. In another example, the predefined threshold vale may correspond to a selected number. In some examples, a total change in the loss function may be defined as a sum of the two or more changes in the loss function, which correspond to the neural network structures to be pruned. For example, the total change may be written as $\lambda_{tot} = \Sigma_{q \in M} \lambda_q$ when M network structures are pruned.

The present description may further include the provision of a randomly initialized neural network. In some examples, a plurality of weights of the randomly initialized neural network may be initialized on random numbers, which are randomly distributed at a predefined interval. In some cases, a random number generator is used for this purpose, which provides evenly or unevenly distributed values at the predefined interval. In other examples, a plurality of weights of the randomly initialized neural network may be initialized by different (not necessarily random) values (for example, in order to break a symmetrical distribution with respect to the initial weights).

Figure 3C:
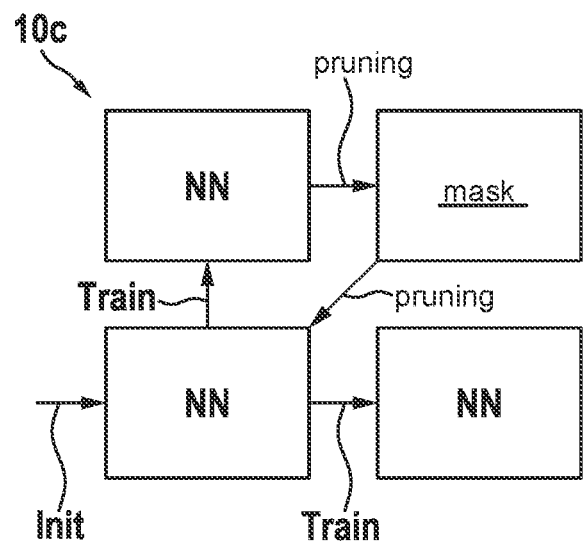
Figure 3D:
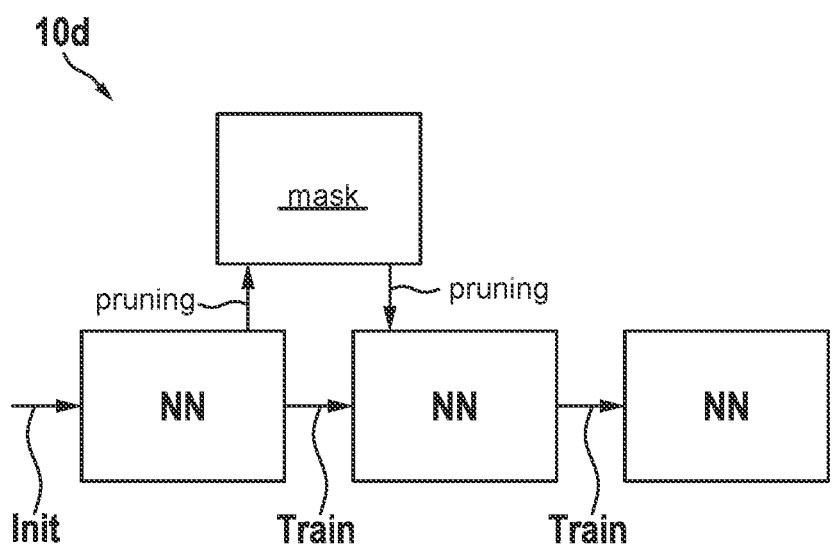

In some examples, as mentioned above, the predefined neural network may be the randomly initialized neural network. In this case, a simplified randomly initialized neural network may be generated from the randomly initialized neural network, two or more neural network structures of the randomly initialized neural network having been pruned with respect to the randomly initialized neural network based on the determined two or more changes in the loss function. Next, the generated simplified randomly initialized neural network may be trained (for example, using a received data set (X)). This scenario 10a is apparent from FIG. 3A, for example. In some cases, the resulting neural network may be retrained, for example, using a data set that differs from received data set (X) in order, for example, to provide the same number of total training steps as in the methods summarized in FIGS. 3B through 3D (the number of total training steps shown in FIGS. 3B through 3D is two, see the following discussions for further details). In FIG. 4, (left-hand portion 11a), mean values of classification accuracy 20 are shown for the pruning methods used in FIG. 3A and the errors of this mean value (vertical bar; 3 tests have been used) as a function of different values of the pruning ratio. The pruning ratio of zero corresponds to the case in which the randomly initialized neural network is not pruned. The result of the present procedures is compared with respective result 21 of a random pruning method, which selects structures to be randomly (using a uniform distribution) pruned from the plurality of neural network structures of the predefined neural network, until a desired pruning ratio (the x-axis in FIG. 4) is achieved. The classification accuracy, which has been achieved by using the present procedures, appears to be better for the values of the pruning ratio greater than 0.2 and less than 0.7 than the classification accuracy, which has been obtained based on the random pruning method. Furthermore, FIG. 5 shows (left-hand portion 12a) an exemplary distribution of the layer pruning ratio of the trained simplified randomly initialized neural network (corresponds to the scenario shown in FIG. 3A) as a function of the layer index of the neural network for a test from FIG. 4 (left-hand portion 11a). The present procedures are applied to the convolutional neural network "DenseNet-40-BC", which is available at the link https://arxiv.org/abs/1608.06993v5 (see also "Proceedings of the IEEE Conference on computer vision and pattern recognition, pp. 4700-4708, 2017") using the "Cifar10" data set (see the link https://www.cs.toronto.edu/~kriz/learning-features-2009-TR.pdf).

In one alternative method, the randomly initialized neural network is initially trained in order to generate a trained neural network. In this case, the generated trained neural network is selected as the predefined neural network. In some cases, received data set X introduced above for training the randomly initialized neural network may be used for this purpose. Alternatively or in addition, another data set may also be used in this context. Next, the method may include the generation of a simplified trained neural network from the generated trained neural network, two or more neural network structures of the generated trained neural network having been pruned based on the determined two or more changes in the loss function with respect to the generated trained neural network. Finally, the generated simplified trained neural network may be trained. In some cases, the training may be carried out using received data set X. This scenario 10b is summarized, for example, in FIG. 3B. In FIG. 4 (right-hand portion 11b), as described similarly above, mean values of classification accuracy 22 for the pruning methods used in FIG. 3B and the errors of this mean value (vertical bar; 3 tests have been used) are shown as a function of different values of the pruning ratio. The result of the present procedures is compared with respective result 23 of a random pruning method, which selects structures to be randomly (using a uniform distribution) pruned from the plurality of neural network structures of the predefined neural network until a desired pruning ratio (the x-axis in FIG. 4) is achieved. The classification accuracy, which has been achieved by using the present procedures, appears to be better for the values of the pruning ratio greater than 0.1 and less than 0.7 (i.e., at the entire interval shown) than the classification accuracy, which has been obtained based on the random pruning method. Moreover, the classification accuracy using the present procedures is better for the case in which the predefined neural network corresponds to the generated trained neural network (curve 22 is noticeably higher than curve 20 in FIG. 4): In other words, it may be necessary in some cases to first train and then to prune the randomly initialized neural network in order to achieve a particular accuracy (for example, 85% or higher, 90% or higher) and a corresponding total capacity. Furthermore, FIG. 5 (right-hand portion 12b) shows an exemplary distribution of the layer-pruning ratio of the trained simplified neural network (corresponds to the scenario shown in FIG. 3B) as a function of the layer index of the neural network for a test from FIG. 4 (right-hand portion 11b).

In one further alternative method, the randomly initialized neural network is initially selected as the predefined neural network. In one next step, the randomly initialized neural network is trained in order to generate a trained neural network. In some cases, received data set X introduced above for the training of the randomly initialized neural network may be used for this purpose. Alternatively or in addition, another data set may also be used in this context. The method may then include the determination of two or more neural network structures to be pruned of the generated trained neural network based on the determined two or more changes in the loss function with respect to the generated trained neural network. Next, the method may include the pruning of corresponding two or more neural network structures of the randomly initialized neural network based on the determined two or more neural network structures to be pruned of the generated trained neural network, in order to generate a simplified randomly initialized neural network. Finally, the generated simplified randomly initialized neural network may be trained. In some cases, the training may be carried out using received data set X. This scenario 10c is represented, for example, in FIG. 3C.

One further alternative method may initially include the determination of two or more neural network structures to be pruned of the randomly initialized neural network based on the determined two or more changes in the loss function with respect to the randomly initialized neural network. The present procedures may then include the training of the randomly initialized neural network, in order to generate a trained neural network, the generated trained neural network being the predefined neural network. In some cases, received data set X introduced above for the training of the randomly initialized neural network may be used for this purpose. Alternatively or in addition, another data set may also be used in this context. Next, the method may include the pruning of corresponding two or more neural network structures of the generated trained neural network based on the determined two or more neural network structures to be pruned of the randomly initialized neural network. Finally, the generated simplified trained neural network may be trained. In some cases, the training may be carried out using received data set X. This scenario 10d is shown, for example, in FIG. 3D.

In the present description, a partially trained neural network (where the term "partially trained" may be understood in the sense introduced above) may be used in some cases instead of the randomly initialized neural network. Alternatively or in addition, the partially trained neural network may be selected as the predefined neural network. In some examples, the trained neural network, which has been described in connection with the aforementioned method (see in this regard FIGS. 3A through 3D), may correspond to a respective partially trained neural network. As discussed above, the simplified computer-implemented neural networks of this description are used in various devices. In general, the present description also relates to methods which, on the one hand include a pruning of a computer-implemented neural network and subsequently the use of the computer-implemented neural network in a device. The use may, for example, include the controlling (or regulating) of the device by the simplified neural network, the recognition of an operating state (for example, of a malfunction) of the device or of a state of the environment of the device by the simplified neural network or the assessment of an operating state of the device or a state of the environment of the device by the simplified neural network. In these cases, the input data may contain state data with respect to an internal state of the device (for example, at least partially sensor data). In addition or alternatively, the input data may contain state data with respect to the surroundings of the device (for example, at least partially sensor data). The output data of the simplified neural network may characterize an operating state or another internal state of the device (for example, whether or not an error, an anomaly or a critical operating state is present). The output data may be used to control the device as a response to the characterized operating state to another internal state. Alternatively or in addition, the output data may contain control data for the device.

In some cases, the device may be a vehicle (for example, as mentioned above, a motor vehicle such as an at least semi-autonomously operating/assisted motor vehicle or a ship, a train, an aircraft or a spacecraft). In other cases, the device may be a component of a vehicle (for example, a vehicle computer). In still other cases, the device may be an electrical device (for example, a tool, a household appliance or a gardening tool). In still other examples, the device may be a device in the Internet of Things. Alternatively or in addition, the device may be a battery-operated device (for example, with a power consumption of less than 5 kW maximum power). As described above, the simplified computer-implemented neural networks may be advantageous in these environments, because they may be designed in a relatively resource-efficient manner.

The simplified computer-implemented neural network may be used for classifying a time series and/or for classifying image data (i.e., the device is an image classifier). The image data may, for example, be camera data, LIDAR data, ultrasound data or thermal image data (for example, generated by corresponding sensors). The image data may include single images or video data. In some cases, the computer-implemented neural network may be designed for a monitoring task (for example, of a manufacturing process and/or for quality assurance) or for a medical imaging system (for example for interpreting diagnostic data) or may be used in such a device. The image classifier may be designed to receive image data and to classify them in multiple classes. In some examples, this may include the mapping of input data in the form of an input vector of a dimension ($R^n$), which contains the image data, on output data in the form of an output vector of a second dimension ($R^m$), which represents a classification result. For example, components of the input vector may represent a plurality of received image data. Each component of the output vector may represent a result of an image classification, which is calculated with the aid of the simplified computer-implemented neural network. In some examples, the image classification may include a semantic segmentation of an image (for example, area-wise and/or pixel-wise classification of the image). The image classification may, for example, be an object classification. For example, the presence of one or of multiple objects in the image data may be detected (for example in a driver assistance system, in order to automatically recognize traffic signs or driving lanes).

In other examples (or additionally), the computer-implemented neural network may be designed or used for monitoring the operating state and/or the surroundings of an at least semi-autonomous robot. In some examples, the at least semi-autonomous robot may be an industrial robot. In other examples, the device may be a machine or a group of machines (for example, of an industrial facility), whose operating state and/or the surroundings is/are monitored. For example, an operating state of a machine tool may be monitored. In these examples, input data x may contain state data of the at least semi-autonomous robot, of the machine or group of machines and/or of their surroundings and output data y may contain information relating to the operating state and/or to the surroundings of the respective device.

In further examples, the system to be monitored may be a communications network. In some examples, the network may be a telecommunications network (for example, a 5G network). In these examples, input data x may contain utilized capacity data in nodes of the network and output data y may contain information relating to the allocation of resources (for example, channels, bandwidth in channels of the network or other resources). In other examples, a network malfunction may be recognized.

In other examples (or additionally), the computer-implemented neural network may be designed or used for controlling (or regulating) a technical device. The device may, in turn, be one of the devices discussed above (or below) (for example, an at least semi-autonomous robot or a machine). In these examples, input data x may contain state data of the technical device and/or of its surroundings and output data y may include a control variable of the respective technical system.

In yet other examples (or additionally), the computer-implemented neural network may be designed or used for filtering a signal (for example for removing an interference component and/or a noise). In some cases, the signal may be an audio signal or a video signal. In these examples, output data y may contain a filtered signal.

One second aspect of the present description relates to a computer program, which is designed to carry out the computer-implemented method according to the first general aspect of the present description. The present description also relates to a computer-readable medium (for example, a machine-readable memory medium such as, for example, an optical memory medium or read-only memory, for example, FLASH memory) and signals, which store or code the computer program of the present description.

One third general aspect of the present description relates to a computer-implemented system for generating and/or applying a computer-implemented neural network, which is designed to carry out the method according to the first general aspect of the present description. In addition or alternatively, the computer-implemented system of the third general aspect is designed to execute the computer program according to the second general aspect of the present description. The computer-implemented system may include at least one processor, at least one memory (which may contain programs which, when executed, carry out the method of the present description), as well as at least one interface for inputs and outputs. The computer-implemented system may be a "stand-alone" system or a distributed system, which communicates via a network (for example, the Internet).

What is claimed is:

1. A method for generating a simplified computer-implemented neural network, the method comprising the following steps:
- receiving a predefined neural network, which includes a plurality of neural network structures and is described by a plurality of weights, each respective neural network structure of the plurality of neural network structures being assigned a respective pruning vector which describes a change of the plurality of weights as a result of pruning of the respective neural network structure;
- calculating a product of a matrix including a structure vector, the matrix including partial second order derivations of a loss function with respect to the plurality of weights, each weight of the plurality of weights, which belong to two or more neural network structures to be pruned of the plurality of neural network structures, corresponding to a respective component of the structure vector;
- determining two or more changes in the loss function with respect to the predefined neural network, each change of the two or more changes occurring as a result of the pruning of a corresponding neural network structure of the two or more neural network structures to be pruned, the determination of the two or more changes in the loss function being carried out using the calculated product, the respective pruning vector and an instantaneous plurality of weights of the predefined neural network; and
- pruning at least one neural network structure of the plurality of neural network structures based on the determined two or more changes in the loss function, to generate the simplified neural network.

2. The method as recited in claim 1, wherein each respective pruning vector of a corresponding neural network structure to be pruned includes weights from the plurality of weights, which belong to the corresponding neural network structure to be pruned, as components, corresponding other components of the respective pruning vector being set to zero, which correspond to weights that do not belong to the corresponding network structure to be pruned.

3. The method as recited in claim 1, wherein the matrix is a Hessian matrix, which contains the partial second order derivations of the loss function with respect to the plurality of weights, and the product is a Hessian vector product of the Hessian matrix including the structure vector.

4. The method as recited in claim 1, wherein the determination of the respective change of the two or more changes in the loss function, which occurs as a result of the pruning of a respective neural network structure of the two or more neural network structures to be pruned, includes the calculation of a respective first contribution via a calculation of a scalar product of the respective pruning vector assigned to the respective neural network structure, using the calculated product, and the plurality of weights of the predefined neural network is subsequently inserted into the first contribution.

5. The method as recited in claim 1, wherein the determination of the two or more changes in the loss function is further carried out using a gradient of the respective two or more pruning vectors, and the plurality of weights of the predefined neural network, the gradient including first derivations of the loss functions according to their weights.

6. The method as recited in claim 5, wherein the determination of the respective change of the two or more changes in the loss function, which occurs as a result of the pruning of a respective neural network structure of the two or more neural network structures to be pruned, includes calculation of a respective second contribution via calculation of a scalar product of the respective pruning vector which is assigned to the respective neural network structure, and of the gradient, and the plurality of weights of the predefined neural network is subsequently inserted into the second contribution.

7. The method as recited in claim 6, wherein the determination of each change of the two or more changes in the loss function includes a calculation of the respective second contribution.

8. The method as recited in claim 6, wherein the determination of the respective change of the two or more changes in the loss function, which occurs as a result of the pruning of a respective neural network structure of the two or more neural network structures to be pruned, includes the calculation of a respective first contribution via a calculation of a scalar product of the respective pruning vector assigned to the respective neural network structure, using the calculated product, and the plurality of weights of the predefined neural network is subsequently inserted into the first contribution, and wherein the determination of a respective change of the two or more changes in the loss function includes the following steps:
- calculating a first product by multiplying the respective first contribution by a first weight factor;
- calculating a second product by multiplying the respective second contribution by a second weight factor;
- summing the amount of the first product with the amount of the second product or summing the first product with the second product, to calculate the respective change.

9. The method as recited in claim 8, wherein an identical first weight factor and an identical second weight factor are used for determining each change of the two or more changes in the loss function.

10. The method as recited in claim 1, wherein the pruning, based on the determined two or more changes in the loss function, further includes the following steps:
- pruning a neural network structure which corresponds to a smallest change of the two or more changes in the loss function;
- iteratively pruning the corresponding two or more neural network structures of the two or more neural network structures to be pruned, each neural network structure to be subsequently pruned corresponding to a next larger value of the two or more changes.

11. The method as recited in claim 10, wherein the iterative pruning is carried out until a size of the simplified neural network falls below a desired size and/or until a total capacity of the simplified neural network falls below a predefined threshold value.

12. The method as recited in claim 1, further comprising:
- providing a randomly initialized neural network, a plurality of weights of the randomly initialized neural network being initialized on random numbers, which are randomly distributed at a predefined interval.

13. The method as recited in claim 12, wherein the predefined neural network is the randomly initialized neural network, and the method further comprises:
- generating a simplified randomly initialized neural network from the randomly initialized neural network, two or more neural network structures of the randomly initialized neural network having been pruned based on the determined two or more changes in the loss function with respect to the randomly initialized neural network; and training the generated simplified randomly initialized neural network.

14. The method as recited in claim 12, further comprising:
training the randomly initialized neural network, in order to generate a trained neural network, the generated trained neural network being the predefined neural network;
generating a simplified trained neural network from the generated trained neural network, two or more neural network structures of the generated trained neural network having been pruned based on the determined two or more changes in the loss function with respect to the generated trained neural network; and
training of the generated simplified trained neural network.

15. The method as recited in claim 1, wherein the predefined neural network is an image classifier, the image classifier being configured to receive input data in the form of image data and to classify the image data, based on a semantic segmentation of the image data, into one or multiple classes.

16. A non-transitory computer-readable storage medium on which is stored a computer program for generating a simplified computer-implemented neural network, the computer program, when executed by a computer, causing the computer to perform the following steps:
receiving a predefined neural network, which includes a plurality of neural network structures and is described by a plurality of weights, each respective neural network structure of the plurality of neural network structures being assigned a respective pruning vector which describes a change of the plurality of weights as a result of pruning of the respective neural network structure;
calculating a product of a matrix including a structure vector, the matrix including partial second order derivations of a loss function with respect to the plurality of weights, each weight of the plurality of weights, which belong to two or more neural network structures to be pruned of the plurality of neural network structures, corresponding to a respective component of the structure vector;
determining two or more changes in the loss function with respect to the predefined neural network, each change of the two or more changes occurring as a result of the pruning of a corresponding neural network structure of the two or more neural network structures to be pruned, the determination of the two or more changes in the loss function being carried out using the calculated product, the respective pruning vector and an instantaneous plurality of weights of the predefined neural network; and
pruning at least one neural network structure of the plurality of neural network structures based on the determined two or more changes in the loss function, to generate the simplified neural network.

17. A computer-implemented system configured to generate for generating a simplified computer-implemented neural network, the computer-implemented system configured to:
receive a predefined neural network, which includes a plurality of neural network structures and is described by a plurality of weights, each respective neural network structure of the plurality of neural network structures being assigned a respective pruning vector which describes a change of the plurality of weights as a result of pruning of the respective neural network structure;
calculate a product of a matrix including a structure vector, the matrix including partial second order derivations of a loss function with respect to the plurality of weights, each weight of the plurality of weights, which belong to two or more neural network structures to be pruned of the plurality of neural network structures, corresponding to a respective component of the structure vector;
determine two or more changes in the loss function with respect to the predefined neural network, each change of the two or more changes occurring as a result of the pruning of a corresponding neural network structure of the two or more neural network structures to be pruned, the determination of the two or more changes in the loss function being carried out using the calculated product, the respective pruning vector and an instantaneous plurality of weights of the predefined neural network; and
prune at least one neural network structure of the plurality of neural network structures based on the determined two or more changes in the loss function, to generate the simplified neural network.

* * * * *